April 17, 1928.  
W. B. JOHNSON  
SHORT STEM MILO MAIZE HEADER  
Filed Feb. 11, 1925

Fig. 2.

Warren B. Johnson
INVENTOR
BY Victor J. Evans
ATTORNEY

WITNESS: G. T. L. Wright

April 17, 1928.

W. B. JOHNSON

SHORT STEM MILO MAIZE HEADER

Filed Feb. 11, 1925

Warren B. Johnson
INVENTOR

BY Victor J. Evans
ATTORNEY

WITNESS:

April 17, 1928.  
W. B. JOHNSON  
SHORT STEM MILO MAIZE HEADER  
Filed Feb. 11, 1925  
1,666,824  
6 Sheets-Sheet 6

Patented Apr. 17, 1928.

1,666,824
UNITED STATES PATENT OFFICE.

WARREN B. JOHNSON, OF LUBBOCK, TEXAS.

SHORT-STEM MILO-MAIZE HEADER.

Application filed February 11, 1925. Serial No. 8,527.

One object of my present invention is the provision of a generally efficient milo maize header.

Another object is the provision in a header for millo maize and other crops of efficient means for eliminating long stems from the harvested heads.

Another object is the provision in such a header of efficient means for delivering severed heads to a receptacle or to a conveyer.

Another object is the provision in such a header of efficient means for blowing leaves and the like from the heads.

Another object is the provision in such a header of efficient means for discharging stalks from the apparatus after heads are severed from the stalks.

Another object is the provision in such a header of efficient elevating-conveyer means for delivering the heads to a vehicle moved alongside the apparatus.

Other objects and practical advantages of the invention will be fully understood from the following description and claims when the same are read in connection with the drawings, accompanying and forming part of this specification, in which:—

Figure 12 is an enlarged detail view illustrative of a portion of the driving connection to the endless apron in the elevating conveyer.

Similar numerals of reference designate corresponding parts in all of the views of the drawings.

Figure 4:
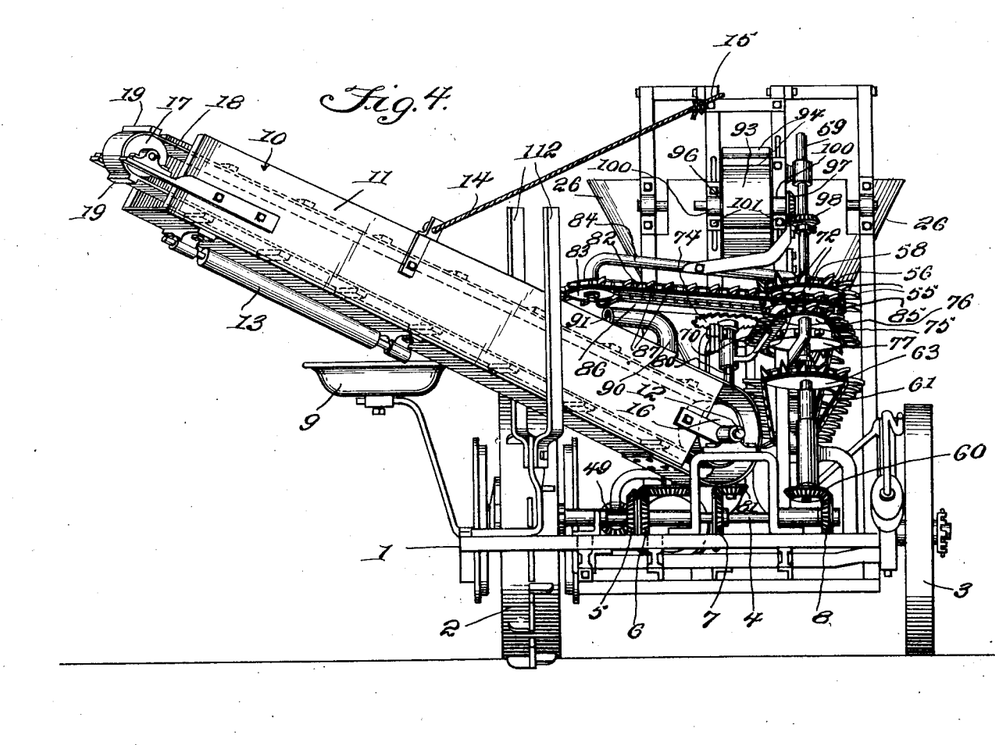
Figure 4 is a rear elevation of the embodiment shown in Figure 3.

My novel header comprises a main frame 1 of appropriate construction, supported by ground wheels 2 and 3, rotation of the ground wheel 2 being depended upon to drive working parts of the header, and the said ground wheel 2 being therefore appropriately connected, preferably in the conventional manner, to a transverse shaft 4 on which are beveled gears 5, 6, 7 and 8 as best shown in Figure 4. At 9 is a driver seat supported on the main frame 1 at the left hand side thereof.

Figure 1:
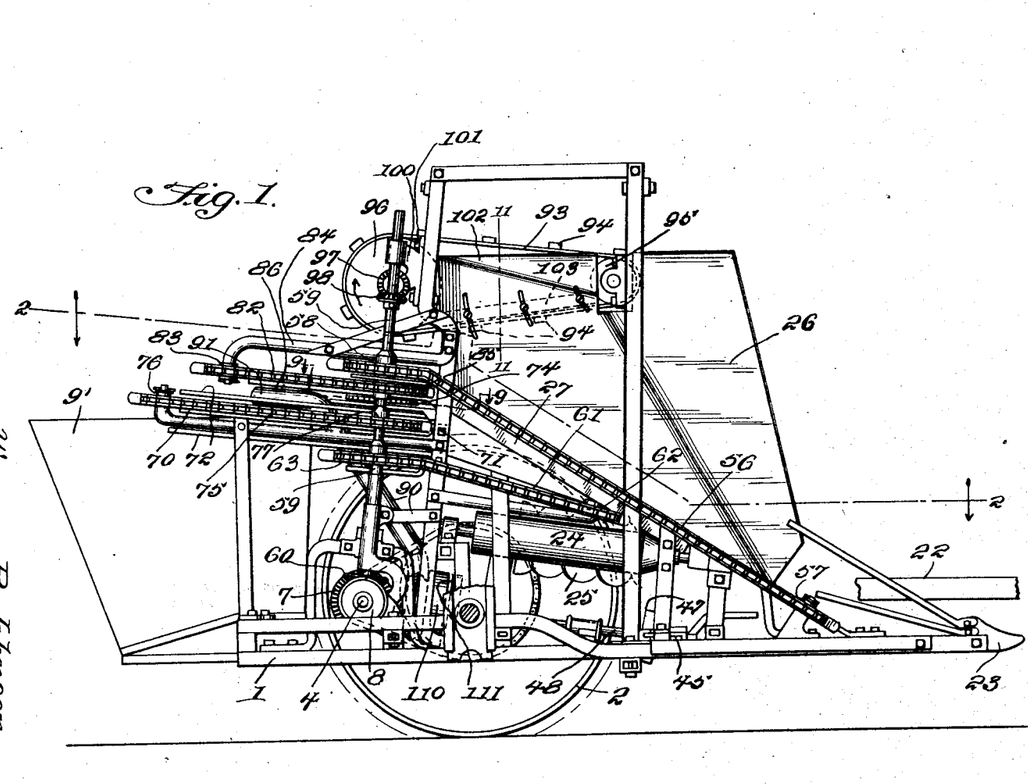
Figure 1 is a view showing the major portion of the right hand side of the header constituting the preferred embodiment of my invention in side elevation, the right hand ground wheel being omitted, and the header being shown as provided with a receptacle for the reception of severed heads.
Figure 2:
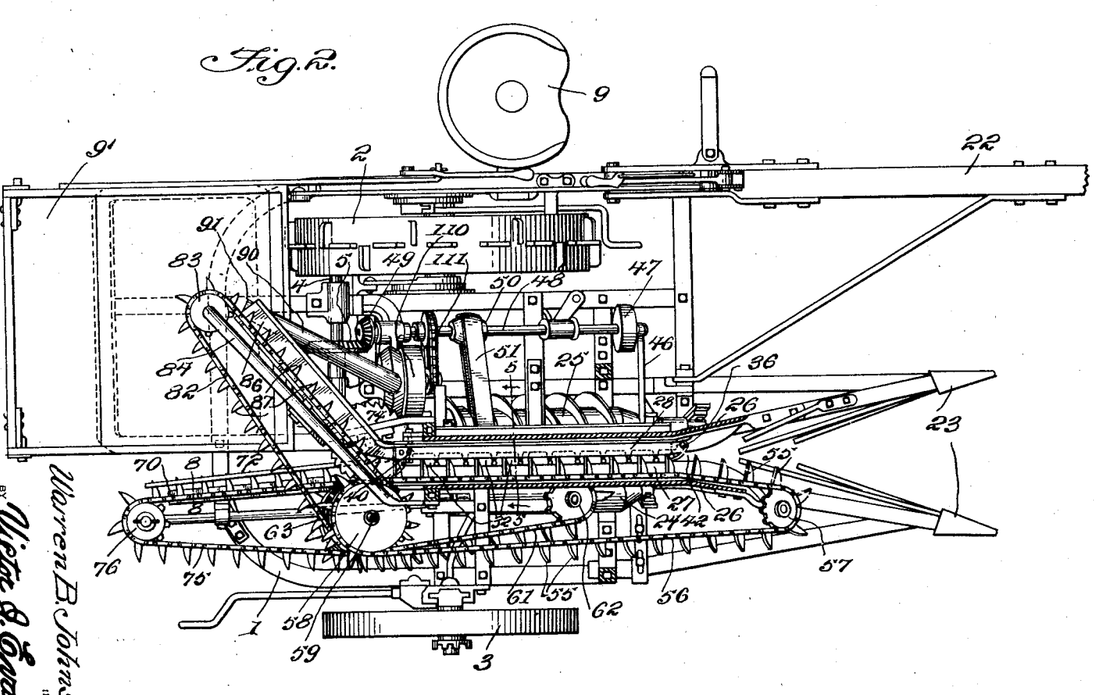
Figure 2 is a horizontal section of the same taken on the line 2—2 of Figure 1, looking downwardly.

In the embodiment shown in Figures 1 and 2, the header is provided with a receptacle 9' designed to receive severed heads and which may be of any desired construction without affecting my invention.

Figure 3:
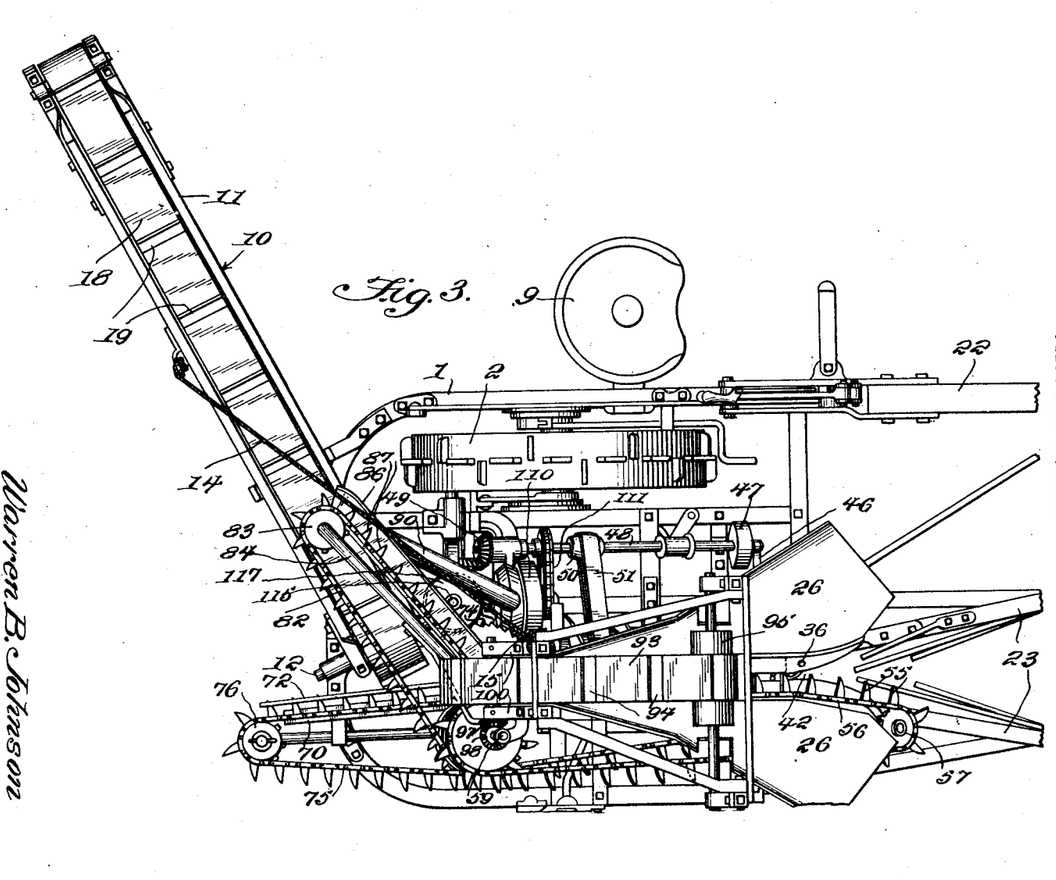
Figure 3 is a full top plan view but showing the header as equipped with an elevating conveyer in lieu of the before mentioned receptacle.
Figures 11, 13, 14, 16:
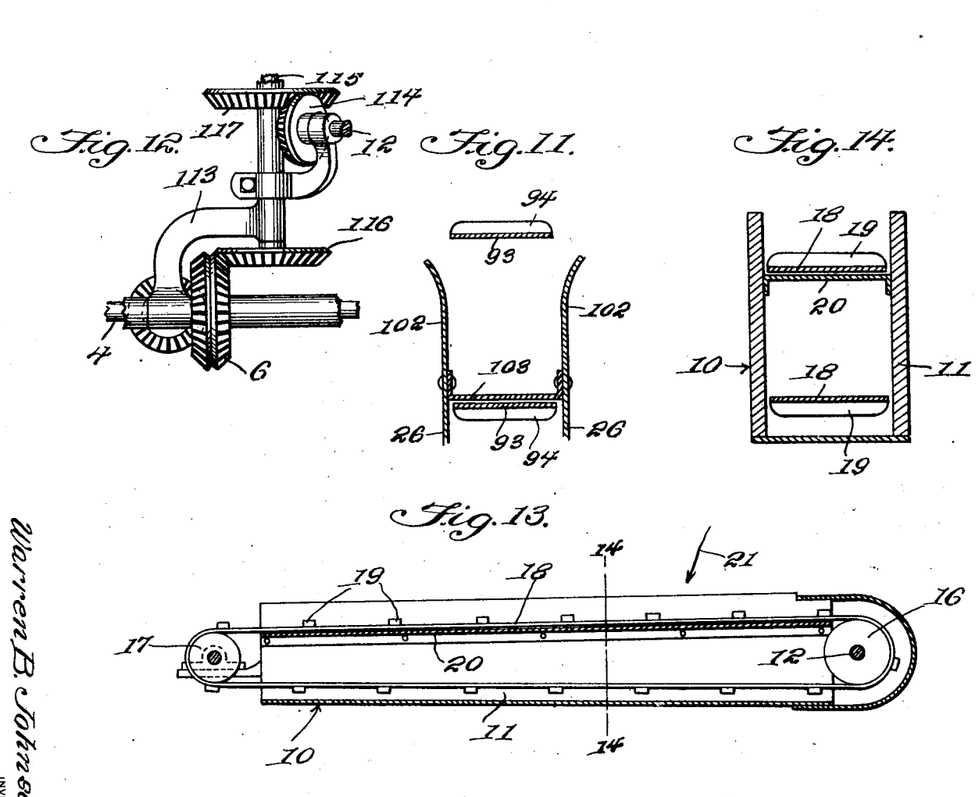
Figure 11 is a detail fragmentary section on the line 11—11 of Figure 1.
Figure 13 is a detail longitudinal section of the elevating conveyer.
Figure 14 is a cross-section on the line 14—14 of Figure 13.

In the embodiment shown in Figures 3 and 4 an elevating conveyer 10 is employed, the said conveyer including a trough 11 pivoted to be swung vertically on the element 12 which is preferably a rotary shaft. The elevating conveyer 10 is designed to receive severed heads and discharge such heads into a vehicle moving alongside the header and the trough 11 is provided at 13 with an anti-friction roller designed to bear on one side wall of the body of the vehicle. A cable 14 is connected to the trough 11 and is adjustably connected at 15 to the main frame 1 so that the elevating conveyer may be maintained at various angles of inclination as condition requires. In addition to the trough 11 the elevating conveyer 10 includes a pulley 16, fixed to the shaft 12, an outer idler pulley 17, an endless apron 18 with transverse cleats 19, and a support 20 in the trough 11 disposed under the upper stretch of the apron 18 in order to prevent sagging of said apron. As will presently appear milo maize heads are discharged upon the upper stretch of the apron 18 and about the point designated by the arrow numbered 21 in Figure 13.

At 22 is a tongue or pole connected to the main frame of the header and designed for the attachment of draft animals.

As will be readily understood by comparison of Figures 1, 2 and 3 my novel header comprises forward divergent guides 23, and it also comprises a longitudinal idler roller 24 and a roller 25, the latter roller being designed to exert a downward and forward pull of pressure on the stalks as they traverse the longitudinal passage of the header as hereinafter described. The roller 25 may be and preferably is of the type disclosed in my contemporary application filed January 14, 1924, Serial Number 686,155, the roller in the said contemporary application being designated by 21. I do not desire, however, to be understood as confining myself to the roller disclosed in my contemporary application inasmuch as any other roller having the capacity of function indicated may be employed without affecting my present invention.

Figures 5, 6, 7, 8, 9, 10:
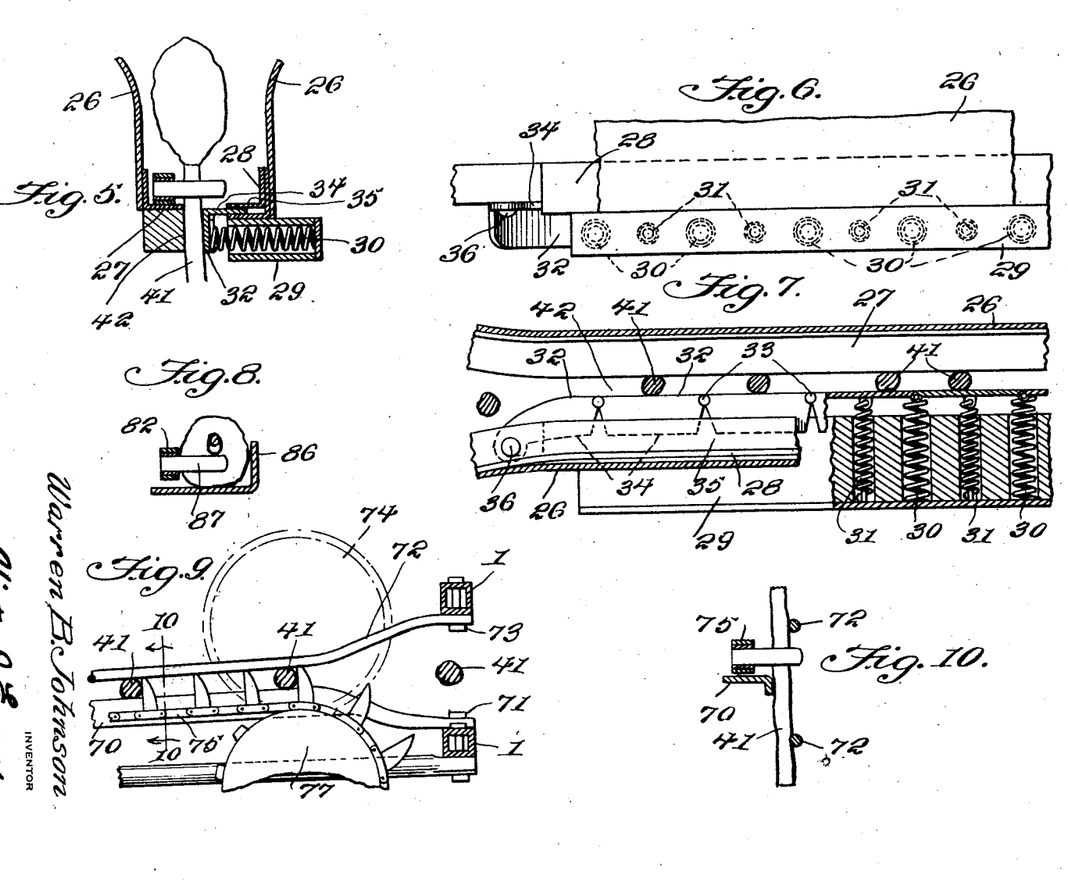
Figure 5 is an enlarged fragmentary section taken in the plane indicated by the line 5—5 of Figure 2.
Figure 6 is a detail side elevation taken from a viewpoint at the right of Figure 5 and showing a portion of the structure whereby the peculiar and advantageous stalk passage is formed.
Figure 7 is a view, partly in plan and partly in section, illustrative of a portion of the structure whereby said passage is formed.
Figure 8 is a transverse section taken in the plane indicated by the line 8—8 of Figure 2.
Figure 9 is a detail section taken approximately on the line 9—9 of Figure 1.
Figure 10 is a cross-section on the line 10—10 of Figure 9.

At 26, Figures 1, 2 and 3, are upright guards which have flared or divergent upper portions and also have flared forward portions and are appropriately fixed to the frame 1. The guards 26 are also shown in Figure 5 and by comparing Figure 5 with Figures 6 and 7 and the other figures of the drawings, the before mentioned passage for the stalks will be understood as comprising a fixed longitudinal inclined beam 27, a fixed frame 28 arranged in spaced and parallel relation to the beam 27, a housing 29 fixed to the frame 28, springs 30 and 31 arranged in the housing 29 in the relation best shown in Figures 5 and 7, and a flexible pressure member made up of a plurality of links 32, flexibly or hingedly connected at 33 and having right angled disposed portions 34 sheathed and movable rectilinearly in superposed spaced plates forming a portion of the frame 28 and providing a guide 35. The forward link 32 is flared as best shown in Figure 7 and is pivotally connected at 36 to the frame 28, while the rearmost link 32 is fixedly connected at 40 through the frame 28 as shown in Fig. 2. It will also be noticed that springs 30 and 31 are interposed between and connected to the links 32 and the housing 29, the springs 30 being designed to press the links 32 toward the beam 27 and the springs 31 being designed to prevent undue pressure of the links 32 against the stalks, designated by 41 in the passage which is indicated by 42 in Figure 7. From this it will be understood that the links 32 are designed to afford at all times a passage commensurate in width with the stalks 41 so as to adequately guide the stalks and preclude downward slipping of the heads, but it is to be understood that the pressure on the links 32 is never strong enough to cause the said links to grip the stalks. In other words the links 32 are subjected to sufficient pressure to make the width of the passage 42 suitable for the size of the stalks 41, and while the links 32 are held firmly against the stalks for the purpose indicated they do not grip the stalks.

At 45 my improved header comprises a mechanism for severing the stalks from the ground, the said mechanism including a fixed finger bar and a reciprocatory knife bar, the latter being connected by a pitman 46 with a crank disk 47 on a longitudinal shaft 48 which carries a beveled gear 49 in mesh with the beveled gear 5 on the transverse shaft 4. I would also have it understood that the shaft 48 carries a pulley 50, connected by a belt 51 with the roller 25 for the rotation of the latter about its axis.

The severed stalks designated by 41 are moved rearwardly through the passage 42 by fingers 55 on a sprocket belt 56, the said belt 56 being mounted on a forward idler sprocket gear 57 and being also mounted on a rear sprocket gear 58 which latter is fixed to a shaft 59 having at 60 a beveled gear meshed with the beveled gear 8 of the shaft 4.

For assisting in the rearward movement of the stalks a finger bearing sprocket belt 61 is employed, the said belt 61 being mounted on a forward idler gear 62 and being also mounted on a rear sprocket gear 63 fixed to the shaft 59 so as to be rotated by the shaft 59 which as before described is in connection with and driven from the transverse shaft 4.

For the discharge of stalks from the apparatus I provide the improved means best shown in Figures 2 and 9 of the drawings, the said means comprising a plate 70, fixed at 71 to a portion of the main frame, and rods 72 fixed at 73 to a portion of the main frame and spaced apart one above the other and designed to yieldingly press the stalks against the inner pendent portion of the plate 70 after the manner shown in Figure 10. As best shown in Figure 9 the forward portions of the plate 70 and rods 72 are shaped to form a flared mouth for the free rearward passage of the stalks. The said mouth is arranged in the relation shown in Figure 9 to the rotary saw 74 for severing the heads from the stalks, and in addition to the means described the stalk discharging mechanism comprises a finger bearing belt 75 which is mounted on a rear idler sprocket gear 76 and is also mounted on a forward sprocket gear 77 which is fixed to the before mentioned shaft 59 so that the belt 75 will also be driven from the transverse shaft 4. As appears in Figure 2 the rear ends of the rods 72 are left free, and in this connection, I would have it understood that the said rods 72 are possessed of resiliency so as to yield when conditions demand. Manifestly when the stalks pass from between the rear ends of the plate 70 and the rods 72, the stalks will be impelled rearwardly by the fingers of the belt 75 and in that way will be discharged to the ground and clear of the machine.

The head severing saw 74 is fixed to a shaft 80, Figure 4, and the said shaft 80 is provided at 81 with a beveled gear meshed with the beveled gear 7 so that the saw 74 will be driven from the before mentioned shaft 4.

As will be understood from Figure 1 the saw 74 is located in a horizontal plane above that of the belt 75 and below that of a finger bearing belt 82, the said finger bearing belt 82 is mounted on a rear idler sprocket gear 83 carried by a bracket arm 84 on the main frame, and said belt 82 is also mounted on and driven by a sprocket gear 85 fixed on the before mentioned shaft 59. In this connection it would be noticed that a right hand trough 86, Figures 2 and 8, is fixed to and extends inwardly and rearwardly from the rear end of one side of the before mentioned passage 42, and that one stretch of the belt 82 has its fingers 87 arranged to move above the inner portion of the trough 86. By virtue of this construction and relative arrangement of parts it will be manifest that after the heads are severed from the stalks the heads will be moved before the fingers 87 to the rear end of the trough 86 where the said fingers will be caused to drop into either the receptacle 9' or the elevating conveyer 10 as the case may be.

In order to free the heads from leaves, I provide a conduit 90 having its discharge end 91 arranged as shown in Figures 2 and 4 relative to the rear end of the trough 86 so that a blast of air discharged from the said conduit 90 will operate to free leaves from the heads and to blow the said leaves into the atmosphere without interfering with the gravitation of the heads into the receptacle 9 or the elevating conveyer 10 as the case may be.

An important feature of my invention resides in the employment of the belt 93, Figures 1 and 3, for eliminating long stems by forming an angle with the before described portions at opposite sides of the inclined stalk passage 42. Said belt 93 is provided with cleats 94 and is mounted on a forward idler roller 95 and on a rear drive roller 96, the said drive roller 96 being fixed to a beveled gear 97 which is meshed with a beveled gear 98 on the shaft 59 so that the said belt 93 will also be driven through the shaft 59 from the transverse shaft 4.

The roller 96 is carried by a bracket 100 adjustably fixed at 101 to a portion of the main frame 1, and it will also be noted that the beveled gear 98 is capable of being adjustably fixed at various points in the height of the shaft 59. Also carried by the bracket 100 is a sub-frame 102, Figures 1 and 11, and between the sides of the sub-frame 102 is fixed a plate 103 which rests above the lower stretch of the belt 93 and has for its function to prevent upward giving or deflection of the said lower stretch. Being driven as stated at a rate in conformity with that of the rearward movement of the stalks, and as the belt moves with the stalks the belt exerts a downward pressure on the heads and operates to push the stalks downwardly through the passage 42, and when the lower stretch of the belt 93 passes over the saw the distance between the belt and the passage 42 in the trough is approximately the length of the heads. It will be understood, however, that the belt 93 only acts on the stalks that the roller 25 which is preferably fabricated fails to draw down through the passage 42. From this it follows that it is desirable to adjust the roller 96 relative to the saw so as to accommodate the belt 93 to heads of various lengths.

The before mentioned conduit 90 is connected to a blower casing 110, the said casing containing a rotary fan blower designed to be operated from the shaft 48 through the medium of sprocket gears and a sprocket belt 111, Figure 2.

The trough 11 of the elevating conveyer is free to be moved vertically but is held against lateral deflection by a fixed upright guide 112 on the main frame 1, as best shown in Figure 4.

By reference to Figure 12 it will be understood that the trough 11 is pivotally mounted on the shaft 12, and that the said shaft 12 is carried by a bracket on the shaft housing of shaft 115, which also has thereon one end of a bracket 113 while the opposite end of the bracket 113 is mounted on the shaft 4, and that the shaft 12 is provided with a beveled gear 114 so that the said shaft 12 may be driven from the shaft 4 through the medium of the beveled gear 6, the shaft 115 having a beveled gear 116 in mesh with the gear 6, and a beveled gear 117 fixed on the shaft 115 and meshed with the beveled gear 114. Manifestly this driving connection is such that it will not be disturbed by vertical swinging of the trough 11 on the shaft 12.

In the practical operation of my novel apparatus as described it will be noted as the apparatus traverses a row of milo maize the stalks are severed from the ground by the cutting mechanism described, and are moved rearwardly by the finger bearing belts 56 and 61. Incident to the said rearward moving of the stalks, the stalks will be drawn downwardly by the fabricated roller 25 in conjunction with the idler roller 24, and in such action the rollers 24 and 25 will be assisted by the upper belt 93 provided there are any stalks the heads of which are not down on the bottom of the trough formed by the beam 27, the frame 28 and the spring pressed links 32 before described. When the stalks reach the saw 74 the heads will be severed from the stalks, whereupon the stalks will be discharged by the before described mechanism including the belt 75 while the heads will be delivered by the belt 82 to the receptacle 9 or to the elevating conveyer 10 as the case may be.

Notwithstanding the practical novelty ascribed to and possessed by my improved header, it will be manifest that the header is simple and inexpensive in construction, is reliable in operation and is generally well adapted to withstand the usage to which harvesting machinery of corresponding character is ordinarily subjected.

I have specifically described the preferred embodiment of my invention in order to impart an exact understanding of said embodiment in all respects. I do not desire, however, to be understood as confining myself to the structure disclosed, my invention being defined by my appended claims within the scope of which structural changes may be made without involving departure from my invention.

Having described my invention, what I claim and desire to secure by Letters-Patent, is:—

1. A header comprising an inclined trough with a passage in its bottom, means for moving stalks rearwardly in said passage, means for severing the stalks from the ground, means below the trough for moving severed stalks downwardly through said trough passage, means for severing heads from the said severed stalks following the rearward and downward movements of the stalks, and overhead means for contributing to the downward movement of the stalks incident to the rearward movement thereof; the portion of the trough at one side of said passage including flexibly connected laterally movable links of angular cross-section, superposed spaced plates between which said links are received and for guiding the links in their lateral movements, means for pivotally securing the end links to a portion of the frame, a housing, and springs in the housing and backing the links, some of the said springs adapted to limit inward movement of the links while the other of said springs limit the outward movement.

2. The combination in a header, of a trough having a longitudinal passage for stalks, means below the trough for moving stalks downwardly incident to rearward movement of the stalks, means for moving the stalks rearwardly through the passage, and means above the trough for moving stalks downwardly relative to the trough; the last-named means being in the form of a belt adapted to engage and depress the stalks engaged thereby, a drive roller receiving one end of said belt, an adjustably mounted bracket for said roller and being movable vertically for adjusting the belt accordingly, a frame including sides, a plate extending between and fixed to said sides in a manner to overlie the lower stretch of said belt to prevent deflection thereof, and said belt being mounted for cooperation with the first mentioned moving means.

3. A header comprising a frame, an inclined trough supported by said frame and being provided with a passage in its bottom, means for moving stalks rearwardly in said passage, means for severing the stalks from the ground, means for moving severed stalks downwardly through said passage, means for severing heads from the severed stalks following rearward and downward movements of the stalks, a trough for supporting the heads after disconnection of the same from the stalks, and arranged at a rearward angle with respect to the passage and in communication therewith at one side of its rear end, fingered means having its fingers arranged to travel above the inner portion of the last mentioned trough for moving the heads on this trough to the discharge end thereof, and means underlying the said discharge end for receiving the heads, and including an elevating conveyor mounted for vertical swinging movement, a fixed upright guide secured to said frame and disposed upon opposite sides of said conveyor, adjusting means for said conveyor, and an anti-friction roller carried by said conveyor as and for the purpose specified.

4. The combination in a header, of a beam forming one side of a passage and being stationary, a frame including a guide disposed at the opposite side of said passage, a housing underlying said guide, a movable passage side made up of a plurality of flexibly connected right angle shaped links having a portion arranged in the guide and the remaining portion disposed in confronting relation with respect to said beam, and springs working against each other, said springs being secured in said housing and to said links respectively whereby said movable passage side is yieldably supported with respect to the beam.

5. A header comprising a frame, an inclined trough with a passage in its bottom and secured to said frame, means for moving stalks rearwardly in the passage, means for severing stalks from the ground, means including cooperating rollers arranged side by side over the trough passage for moving stalks downwardly through said passage incident to rearward movement of the stalks, means for severing heads from the severed stalks, means for engaging stalks after severing of the heads and discharging such stalks from the apparatus, said last mentioned means including a plate fixed to said frame, a pendent portion formed with said plate, superposed rods designed to press the stalks against the pendent portion and having free rear ends, a finger bearing belt mounted to have its fingers movable between the rods, said rods and plate being shaped at their forward portions and cooperating to form a flared mouth, a trough for supporting the heads after the disconnection of the same from the stalks, means for moving the heads on said trough to the discharge end thereof, a blower having a conduit arranged in its discharge orifice adjacent to the discharge end of said trough, and means for operating said stalk and head moving means at the same relative speed and from a common shaft.

In testimony whereof I affix my signature.

WARREN B. JOHNSON.